United States Patent
Hamada

(10) Patent No.: US 10,075,796 B2
(45) Date of Patent: Sep. 11, 2018

(54) FILE GENERATION DEVICE, FILE GENERATION METHOD, FILE REPRODUCTION DEVICE, AND FILE REPRODUCTION METHOD

(71) Applicant: SONY CORPORATION, Tokyo (JP)

(72) Inventor: Toshiya Hamada, Saitama (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 14/914,857

(22) PCT Filed: Sep. 19, 2014

(86) PCT No.: PCT/JP2014/074781
§ 371 (c)(1),
(2) Date: Feb. 26, 2016

(87) PCT Pub. No.: WO2015/050001
PCT Pub. Date: Apr. 9, 2015

(65) Prior Publication Data
US 2016/0302020 A1    Oct. 13, 2016

(30) Foreign Application Priority Data

Oct. 4, 2013  (JP) ................. 2013-209054

(51) Int. Cl.
*G06F 17/00* (2006.01)
*H04S 3/00* (2006.01)
(Continued)

(52) U.S. Cl.
CPC .......... *H04S 3/008* (2013.01); *G06F 17/3074* (2013.01); *G06F 17/30743* (2013.01);
(Continued)

(58) Field of Classification Search
CPC ..... G10L 19/008; G10L 19/167; G06F 17/00; G06F 17/3074; G06F 17/30743; H04S 1/007; H04S 3/008; H04S 2240/03
(Continued)

(56) References Cited

U.S. PATENT DOCUMENTS 7,570,770 B2 *  8/2009  Kohno ................. G11B 27/034
                                                      369/4
8,492,635 B2 *  7/2013  Nakanishi ............ G10H 1/0058
                                                      84/601
(Continued)

FOREIGN PATENT DOCUMENTS

JP       2010-262703     11/2010
JP       4622854         2/2011
(Continued)

*Primary Examiner* — Xu Mei
(74) *Attorney, Agent, or Firm* — Chip Law Group

(57) ABSTRACT

The present disclosure relates to a file generation device, a file generation method, a file reproduction device, and a file reproduction method that enable reproduction of multi-channel liner PCM audio data in a file format. AudioSampleEntry is extended and a box specifying ORG LPCM (ORGLPCMSpecificBox) is assigned immediately thereafter. The box specifying ORG LPCM (ORGLPCMSpecificBox) is configured of fields, namely, from the top, audio data size (the number of bytes) (audio_data_payload_size), channel assignment (channel_assignment), sampling frequency (sampling_frequency), number of bits of the sample (quantization bitrate) (bits_per_sample), and reservation area (reserved). The present disclosure can be applied to a signal processing system including a file generation device and a file reproduction device, for example.

11 Claims, 21 Drawing Sheets

(51) Int. Cl.
*G06F 17/30* (2006.01)
*H04S 1/00* (2006.01)
*G10L 19/16* (2013.01)
*G10L 19/008* (2013.01)

(52) U.S. Cl.
CPC .......... *G10L 19/008* (2013.01); *G10L 19/167* (2013.01); *H04S 1/007* (2013.01); *H04S 2420/03* (2013.01)

(58) Field of Classification Search
USPC ........................................ 700/94; 381/22, 23
See application file for complete search history.

(56) References Cited

U.S. PATENT DOCUMENTS

| | | | | |
|---|---|---|---|---|
| 2013/0222690 | A1* | 8/2013 | Kim | H04S 3/00 348/462 |
| 2015/0281842 | A1* | 10/2015 | Yoo | G06F 3/16 381/80 |

FOREIGN PATENT DOCUMENTS

| | | |
|---|---|---|
| JP | 2011-061281 | 3/2011 |
| WO | 2004-084215 | 3/2004 |

* cited by examiner

FIG.1

| Audio Format | Max number of Channel | Sample Rate [kHz] | Max Bitrate [Kbps] | Bitrate Calculation |
|---|---|---|---|---|
| MPEG-4 AAC LC [2-channel] | 2 | 48 | 192 | Stated in specified part of specification |
| MPEG-4 AAC LC [5.1-channel] | 5.1 | 48 | 960 | Stated in specified part of specification |
| LPCM [2-channel] | 2 | 48, 96, 192 | 1536, 3072, 6144 | — |
| ORG LPCM | max. 7.1 | 48, 96, 192 | — | Described later |

FIG.2

```
[Syntax]
Class QTGLPCMAudioSampleEntry extends SampleEntry
(codingname)
{
    const unsigned int(32)      reserved[2] = 0;
    template unsigned int(16)   channelcount;
    template unsigned int(16)   samplesize;
    unsigned int(16)            pre_defined = 0;
    const unsigned int(16)      reserved = 0;
    template unsigned int(32)   samplerate;
    QTGLPCMSpecificBox
}
```

FIG.3

[Semantics]
• codingname=audioformat='fpcm' (fixed value)

• channelcount=2, 4, 6, 8
 - 4, 6, and 8 are values that do not comply with ISO/IEC14496-12

• samplesize =16, 20, 24
 - 20 and 24 are values that do not comply with ISO/IEC14496-12

• samplerate = BB800000h (48000)
 - value is run at fixed 48 kHz and correct fs value is stated in extended BOX

FIG.4

```
[Syntax]
Class ORALPCMSpecificBox extends Box ('fcfg')
{
    unsigned int(32)    audio_data_payload_size;
    unsigned int(4)     channel_assignment;
    unsigned int(4)     sampling_frequency;
    unsigned int(2)     bits_per_sample;
    unsigned int(6)     reserved = 0;
}
```

FIG.5

[Semantics]
· ORGLPCMSpecificBox
 - BOX name is 'fcfg' (fixed value)
 - can be expressed up to 8ch, Q=24bit, fs=192kHz · audio_data_payload_size: determined by sampling frequency, bitrate, and number of channels
· channel_assignment: 11 types
· sampling_frequency: 48, 96, 192. [KHz]
· bits_per_sample: 16, 20, 24 [bits/sample]

FIG.6

| sampling frequency | bits per sample | number of channels | audio_data_payload_size [bytes] |
|---|---|---|---|
| 48 kHz | 16-bit | 2 | 7680 |
| | | 4 | 15360 |
| | | 6 | 23040 |
| | | 8 | 30720 |
| | 20-bit/24-bit | 2 | 11520 |
| | | 4 | 23040 |
| | | 6 | 34560 |
| | | 8 | 46080 |
| 96 kHz | 16-bit | 2 | 15360 |
| | | 4 | 30720 |
| | | 6 | 46080 |
| | | 8 | 61440 |
| | 20-bit/24-bit | 2 | 23040 |
| | | 4 | 46080 |
| | | 6 | 69120 |
| | | 8 | 92160 |
| 192 kHz | 16-bit | 2 | 30720 |
| | | 4 | 61440 |
| | | 6 | 92160 |
| | 20-bit/24-bit | 2 | 46080 |
| | | 4 | 92160 |
| | | 6 | 138240 |

FIG.7

| Value | number of channels | channel configuration | channel number | | | | | | | |
|---|---|---|---|---|---|---|---|---|---|---|
| | | | 1 | 2 | 3 | 4 | 5 | 6 | 7 | 8 |
| 0 | – | Reserved | | | | | | | | |
| 1 | 2ch | Mono | M1 | X | | | | | | |
| 2 | | Reserved | | | | | | | | |
| 3 | | Stereo | L | R | | | | | | |
| 4 | 4ch | L, C, R (3/0) | L | R | C | X | | | | |
| 5 | | L, R, S (2/1) | L | R | S | X | | | | |
| 6 | | L, C, R, S (3/1) | L | R | C | S | | | | |
| 7 | | L, R, LS, RS (2/2) | L | R | LS | RS | | | | |
| 8 | 6ch | L, C, R, LS, RS (3/2) | L | R | C | LS | RS | X | | |
| 9 | | L, C, R, LS, RS, lfe (3/2+lfe) | L | R | C | LS | RS | lfe | | |
| 10 | 8ch | L, C, R, LS, Rls, Rrs, RS (3/4) | L | R | C | LS | Rls | Rrs | RS | X |
| 11 | | L, C, R, LS, Rls, Rrs, RS, lfe (3/4+lfe) ("surround back") | L | R | C | LS | Rls | Rrs | RS | lfe |
| 12 | | L, C, R, LS, RS, Vhl, Vhr, lfe (5/2+lfe) ("front high") | L | R | C | LS | RS | Vhl | Vhr | lfe |
| 13–15 | – | Reserved | | | | | | | | |

M:Mono, L:Left, R:Right, C:Center, S:Surround, Rls:Rear surround left, Rrs:Rear surround right, Vhl:Vertical height left, Vhr:Vertical height right, X:Sample values shall be set to zero.

FIG.8

| Value | Meaning |
|---|---|
| 0 | Reserved |
| 1 | 48kHz |
| 2 | Reserved |
| 3 | Reserved |
| 4 | 96kHz |
| 5 | 192kHz |
| 6-15 | Reserved |

FIG.9

| Value | Meaning |
|---|---|
| 0 | Reserved |
| 1 | 16bits/sample |
| 2 | 20bits/sample |
| 3 | 24bits/sample |

FIG. 12

```
[Syntax]
ORGLPCMAudioDataPayload () {
    ORGLPCMAudioFrame
}

[Semantics]
• ORGLPCMAudioFrame stores 1audio access unit (audio frame)
```

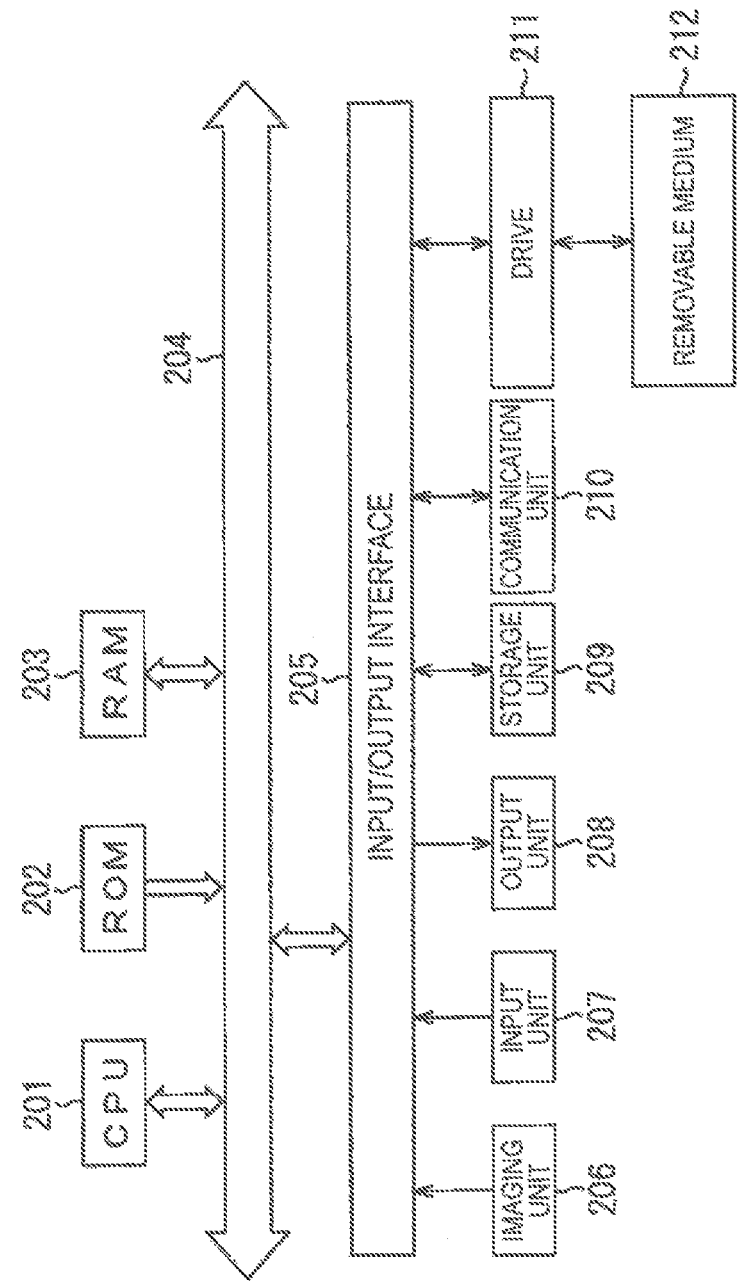

FILE GENERATION DEVICE, FILE GENERATION METHOD, FILE REPRODUCTION DEVICE, AND FILE REPRODUCTION METHOD

TECHNICAL FIELD

The present disclosure relates to a file generation device, a file generation method, a file reproduction device, and a file reproduction method, and, in particular, relates to a file generation device, a file generation method, a file reproduction device, and a file reproduction method that are capable of reproduction of multi-channel liner PCM audio data in a file format.

BACKGROUND ART

Currently, a specification of a file format is being discussed. In the file format, a specification of a multi-channel (more than 5.1ch) noncompressed linear PCM is included. For example, a multi-channel linear PCM is employed in the standard for a Blu-ray (registered trademark) Disc-ROM application (see Patent Literature 1).

DECE CFF (Common File Format) that is the basis of the file format is based on ISO/IEC14496-12 (ISOBMFF: ISO base media file format).

CITATION LIST

Patent Literature

Patent Literature 1: JP 4622854B

SUMMARY OF INVENTION

Technical Problem

However, in ISO base media file format (ISO/IEC14496-12), no definition is made on data storage of a linear PCM.

Furthermore, regarding ISO/IEC standards, Motion JPEG2000 standard (ISO/IEC 15444-3:2007) defines a method of storing a linear PCM with 2ch; however, no definition is made on the method of storing a linear PCM with the number of channels exceeding 2ch. For example, the above standard only stipulates that 2ch quantized samples are stored in the order of L/R/L/R . . . , and no information on channel assignment above 2ch is given.

The present invention is made in view of the above situation and enables, in the file format, multi-channel linear PCM audio data to be reproduced.

Solution to Problem

According to an aspect of the present disclosure, there is provided a file generation device including: a media data generation unit configured to generate media data by forming a stream in which pieces of audio data for the number of channels are serially aligned, the pieces of audio data having been sampled at a same timing; a sample entry generation unit configured to generate a sample entry by setting a box provided with a field that indicates information on channel assignment of the number of channels after AudioSampleEntry that manages a sample of the audio data; and a file generation unit configured to generate a file formed of the media data generated by the encoding unit and the sample entry generated by the sample entry generation unit.

The box may include a field indicating information on the number of readout bytes of the media data.

The media data generation unit may generate, from the stream, media data formed per an access unit in which a plurality of quantized samples are collected. The sample entry generation unit may set, as the information on the number of readout bytes of the media data, the box provided with the field indicating a size of the access unit, and generate a sample entry.

The sample entry generation unit may set the box provided with the field that indicates information on channel assignment of the number of channels immediately after AudioSampleEntry that manages the sample of the audio data.

The box may include a field indicating information on a sampling frequency of the audio data.

The box may include a field indicating information on a quantization bitrate of the audio data.

The number of channels may be either 2ch, 4ch, 6ch, or 8ch.

Channel assignment of the 8ch may be 7.1ch front high.

The sample may be a sample of audio data sampled in a linear PCM format.

According to an aspect of the present disclosure, there is provided a file generation method performed by a file generation device, the file generation method including: generating media data by forming a stream in which pieces of audio data for the number of channels are serially aligned, the pieces of audio data having been sampled at a same timing; generating a sample entry by setting a box provided with a field that indicates information on channel assignment of the number of channels after AudioSampleEntry that manages a sample of the audio data; and generating a file formed of the media data that has been generated and the sample entry that has been generated.

According to another aspect of the present disclosure, there is provided a file reproduction device including: a data separation unit configured to separate a sample entry and media data from a file, the media data having been generated by forming a stream in which pieces of audio data for the number of channels are serially aligned, the pieces of audio data having been sampled at a same timing; a sample entry acquisition unit configured to acquire, from the sample entry separated by the data separation unit, a box provided with a field that indicates information on channel assignment of the number of channels that has been set after AudioSampleEntry that manages a sample of the audio data; and a decoding unit configured to, on a basis of the box acquired by the sample entry acquisition unit, decode the media data separated by the data separation unit and output the sample of the audio data.

The box may include a field indicating information on the number of readout bytes of the media data.

The sample entry acquisition unit may acquire, as the information on the number of readout bytes of the media data, the box provided with the field indicating a size of an access unit in which a plurality of quantized samples are collected, from the stream. On a basis of the box acquired by the sample entry acquisition unit, the decoding unit may decode, per the access unit, the media data separated by the data separation unit and outputs the sample of the audio data.

The sample entry acquisition unit may acquire, from the sample entry separated by the data separation unit, a box provided with a field that indicates information on channel assignment of the number of channels that has been set immediately after AudioSampleEntry that manages the sample of the audio data.

The box may include a field indicating information on a sampling frequency of the audio data.

The box may include a field indicating information on a quantization bitrate of the audio data.

The number of channels may be either 2ch, 4ch, 6ch, or 8ch.

Channel assignment of the 8ch may be 7.1ch front high.

The sample may be a sample of audio data sampled in a linear PCM format.

According to another aspect of the present disclosure, there is provided a file reproduction method performed by a file reproduction device, the file reproduction method including: separating a sample entry and media data from a file, the media data having been generated by forming a stream in which pieces of audio data for the number of channels are serially aligned, the pieces of audio data having been sampled at a same timing; acquiring a box provided with a field that indicates information on channel assignment of the number of channels that has been set after AudioSampleEntry that manages a sample of the audio data; and decoding, on a basis of the box that has been acquired, the media data that has been separated, and outputting the sample of the audio data.

According to an aspect of the present disclosure, media data is generated by forming a stream in which pieces of audio data for the number of channels are serially aligned, the pieces of audio data having been sampled at a same timing, a sample entry is generated by setting a box provided with a field that indicates information on channel assignment of the number of channels after AudioSampleEntry that manages a sample of the audio data, and a file formed of the media data that has been generated and the sample entry that has been generated is generated.

According to another aspect of the present disclosure, a sample entry and media data is separated from a file, the media data having been generated by forming a stream in which pieces of audio data for the number of channels are serially aligned, the pieces of audio data having been sampled at a same timing, a box provided with a field that indicates information on channel assignment of the number of channels that has been set after AndioSampleEntry that manages a sample of the audio data is acquired, and on a basis of the box that has been acquired, the media data that has been separated is decoded, and the sample of the audio data is outputted.

Note that the file generation device and the file reproduction device described above may be independent devices or may be an inner block that constitutes a single signal processing device.

Advantageous Effects of Invention

A first aspect of the present disclosure is capable of generating a file. In particular, in the file format multichannel linear PCM audio data can be reproduced.

A second aspect of the present disclosure is capable of reproducing a file. In particular, in the file format, multi-channel linear PCM audio data can be reproduced.

Note that the effects described in the present description are only exemplifications and the effects of the present technique are not limited to those described in the present description and, further, there may be additional effects.

BRIEF DESCRIPTION OF DRAWINGS

FIG. 1 is a diagram illustrating an example of an audio format.

FIG. 2 is a diagram illustrating an example of syntax of AudioSampleEntry.

FIG. 3 is a diagram illustrating an example of semantics of AudioSampleEntry.

FIG. 4 is a diagram illustrating an example of syntax of a box specifying ORG LPCM.

FIG. 5 is a diagram illustrating an example of semantics of the box specifying ORG LPCM.

FIG. 6 is a diagram illustrating an example of values stored in a field of an audio data size.

FIG. 7 is a diagram illustrating an example of values stored in a field of a channel assignment.

FIG. 8 is a diagram illustrating an example of values stored in a field of a sampling frequency.

FIG. 9 is a diagram illustrating an example of values stored in a field of a number of bits of a sample.

FIG. 12 is a diagram illustrating an example of syntax and semantics of the ORG LPCMAudioDataPayload.

FIG. 24 is a block diagram describing an example of a main configuration of a computer.

DESCRIPTION OF EMBODIMENTS

Figure 10:
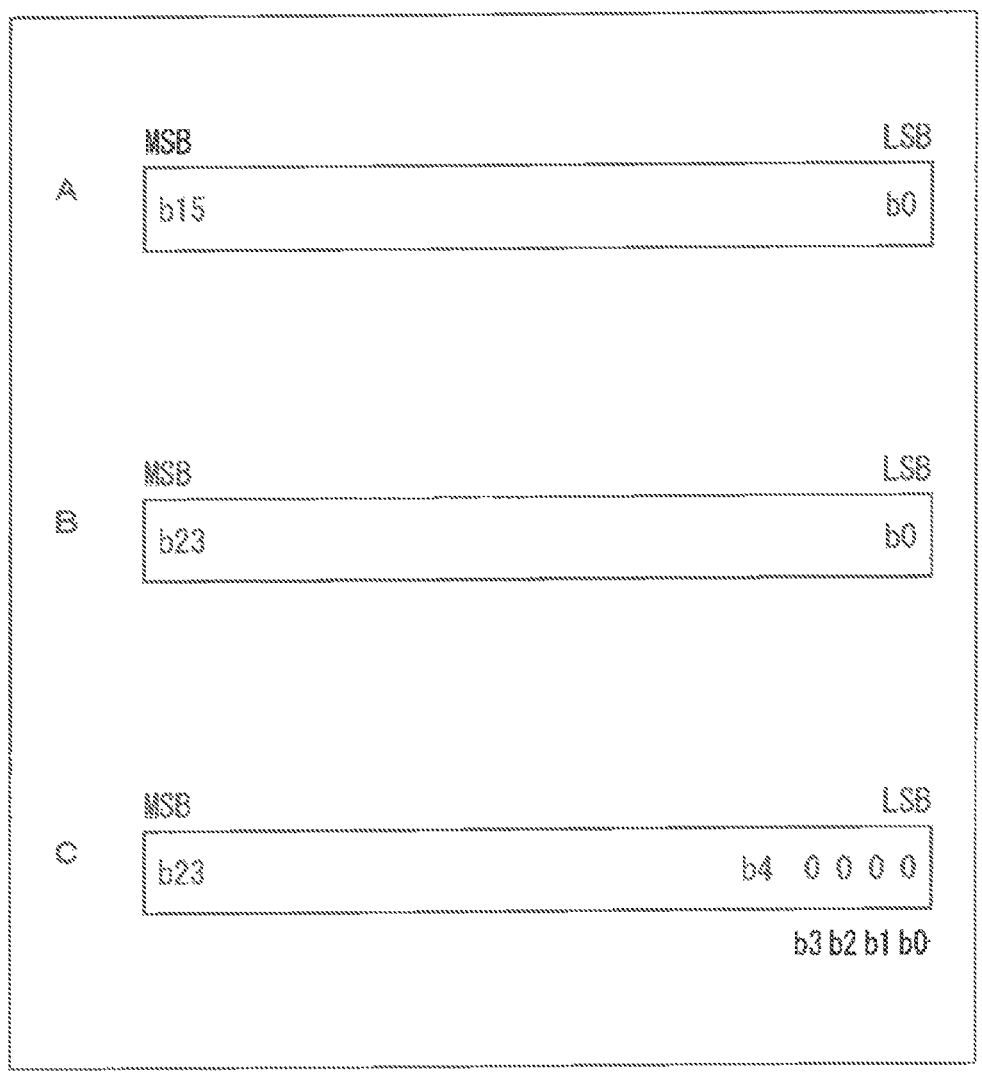
FIG. 10 is a diagram illustrating an exemplary configuration of a sample of each bit number.

Hereinafter, configurations (hereinafter, referred to as embodiments) for implementing the present disclosure will be described. Note that the description will be given in the following order.

1. First Embodiment (Example of Audio Format)
2. Second Embodiment (Example of Signal Processing System)
3. Third Embodiment (Computer)

First Embodiment

<Audio Format>

FIG. 1 is a diagram illustrating audio formats that are approved in the file format, the specification of which is being discussed, as of now. In the examples in FIG. 1, ORIGINAL linear PCM (hereinafter, referred to as ORG LPCM) in the lowest row surrounded by a frame is the audio format to which the present technology is applied.

As illustrated in FIG. 1, in the file format, MPEG-4 AAC LC [2-channel], MPEG-4 AAC LC [5.1-channel], LPCM [2-channel], and ORG LPCM are approved as the audio formats.

MPEG-4 AAC LC [2-channel] is an audio format in which the maximum number of channels is 2, the sample rate is 48 [kHz], and the maximum bitrate is 192 [kbps]. MPEG-4 AAC LC [5.1 channel] is an audio format in which the maximum number of channels is 5.1, the sample rate is 48 [kHz], and the maximum bitrate is 960 [kbps].

LPCM [2-channel] is an audio format in which the maximum number of channels is 2, the sample rates is 48, 96, or 192 [kHz], and the maximum bitrates is 1536, 3072, or 6144 [kbps].

ORG LPCM is an audio format in which the maximum number of channels is 7.1, and the sample rate is 48, 96, or 192 [kHz].

Note that the calculation of the bitrates of MPEG-4 AAC LC [2-channel] and MPEG-4 AAC LC [5.1-channel] is stated in a specified part (not shown) of the specification. Furthermore, the calculation of the bitrate of ORG LPCM will be described later with reference to FIG. 6.

<Syntax of AndioSampleEntry>

FIG. 2 is a diagram illustrating an example of syntax of AudioSampleEntry to which the present technology has been applied. AudioSampleEntry is a box for managing samples of the audio data and represents the attributes of the audio. ORGLPCMAudioSampleEntry (ORG LPCMAudioSampleEntry) in FIG. 2 is an extension of AudioSampleEntry ISOBMFF (ISO/IEC14496-12), and a box specifying ORG LPCM (ORGLPCMSpecificBox) is assigned (set) immediately after the above (in the example in FIG. 2, at the bottom of the internal configuration).

In the example in FIG. 2, a four-lettered code name of ORG LPCMAudioSampleEntry (ORG LPCMAudioSampleEntry) is codingname (see FIG. 3). Furthermore, ORG LPCMAudioSampleEntry is configured of fields, namely, from the top, a reservation area, the number of channels, a sample size, a pre-defined area, a reservation area, and sample rate, and of the box specifying ORG LPCM (ORGLPCMSpecificBox).

<Semantics of AudioSampleEntry>

FIG. 3 is a diagram illustrating an example of semantics corresponding to the syntax in FIG. 2. The semantics illustrated in FIG. 3 expresses the syntax in FIG. 2 in the following manner.

Stated in FIG. 2, codingname is an audio format and is 'fpcm' (a fixed value).

When ORG LPCMAudioSampleEntry, channelcount may be 2, 4, 6, or 8. However, among the above values, 4, 6, and 8 do not comply with ISO/IEC14496-12.

When ORG LPCMAudioSampleEntry, samplesize may be 16, 20 or 24. However, among the above values, 20 and 24 do not comply with ISO/IEC14496-12.

Accordingly, dummy data is installed in each of the fields of channelcount and samplesize in FIG. 2, for example, and the correct information of channelcount and samplesize is set in the field provided in the box specifying ORG LPCM.

Next, samplerate is run at a fixed 48 kHz as BB800000h (48000). Accordingly, in samplerate in FIG. 2, the above fixed value is installed as the dummy data and the correct information of samplerate is set in the field provided in the box specifying ORG LPCM.

<Syntax of Box Specifying ORG LPCM>

FIG. 4 is a diagram illustrating an example of syntax of the box specifying ORG LPCM in FIG. 2.

In the example in FIG. 4, a four-lettered code name of the box specifying ORG LPCM (ORGLPCMSpecificBox) is 'fcfg'. Furthermore, the box specifying ORG LPCM is configured of fields, namely, from the top, audio data size (the number of bytes) (audio_data_payload_size), channel assignment (channel_assignment), sampling frequency (sampling_frequency), number of bits of the sample (in other words, quantization bitrate) (bits_per_sample), and reservation area (reserved).

The field of the audio data size is configured of 32 bits and the field of the channel assignment is configured of 4 bits. Furthermore, the field of the sampling frequency is configured of 4 bits, the field of the number of bits of the sample is configured of 2 bits, and the field of the reservation area is configured of 6 bits.

<Semantics of Box Specifying ORG LPCM>

FIG. 5 is a diagram illustrating an example of semantics corresponding to the syntax in FIG. 4.

The BOX name of the box specifying ORG LPCM (ORGLPCMSpecificBox) is 'fcfg' (a fixed value). The above BOX is capable of representing audio data of up to 8ch, 24 bits of Q (quantization bitrate), and sampling frequency of up to 192 kHz.

A value of the number of readout bytes of the audio data is stored in the field of the audio data size (audio_data_payload_size). The value is determined by the sampling frequency, the number of bits of the sample, and the number of channels. Note that details will be described later with reference to FIG. 6.

A value representing either of the channel assignments among the eleven types of channel assignments is stored in the field of the channel assignment (channel_assignment). Note that details will be described later with reference to FIG. 7.

A value representing either of the three types of frequencies, namely, 48, 96, and 192 [kHz], is stored in the field of the sampling frequency (sampling_frequency). Note that details will be described later with reference to FIG. 8.

A value representing either of the three types, namely, 16, 20, and 24 [bits/sample], is stored in the field of the number of bits of the sample (bits_per_sample). Note that details will be describe later with reference to FIGS. 9 and 10.

Note that the fields stored in the extended box specifying ORG LPCM are unique fields based on multi-channel LPCM of Blu-ray (registered trademark) Disc-ROM.

<Value of Audio Data Size>

FIG. 6 is a diagram illustrating an example of the values stored in the field of the audio data size (audio_data_payload_size) in FIG. 4. In the example in FIG. 6, a size of a single audio frame is indicated in bytes, and the number of bytes of a single audio frame is determined by the sampling frequency, the number of bits of the sample, and the number of channels.

When the sampling frequency is 48 kHz, the number of bits of the sample is 16 bits, and the number of channels is 2, the size of a single audio frame is 7680 bytes. When the sampling frequency is 48 kHz, the number of bits of the sample is 16 bits, and the number of channels is 4, the size of a single audio frame is 15360 bytes. When the sampling frequency is 48 kHz, the number of bits of the sample is 16 bits, and the number of channels is 6, the size of a single audio frame is 23040 bytes. When the sampling frequency is 48 kHz, the number of bits of the sample is 16 bits, and the number of channels is 8, the size of a single audio frame is 30720 bytes.

When the sampling frequency is 48 kHz, the number of bits of the sample is 20/24 bits, and the number of channels is 2, the size of a single audio frame is 11520 bytes. When the sampling frequency is 48 kHz, the number of bits of the sample is 20/24 bits, and the number of channels is 4, the size of a single audio frame is 23040 bytes. When the sampling frequency is 48 kHz, the number of bits of the sample is 20/24 bits, and the number of channels is 6, the size of a single audio frame is 34560 bytes. When the sampling frequency is 48 kHz, the number of bits of the sample is 20/24 bits, and the number of channels is 8, the size of a single audio frame is 46080 bytes.

When the sampling frequency is 96 kHz, the number of bits of the sample is 16 bits, and the number of channels is 2, the size of a single audio frame is 15360 bytes. When the sampling frequency is 96 kHz, the number of bits of the sample is 16 bits, and the number of channels is 4, the size of a single audio frame is 30720 bytes. When the sampling frequency is 96 kHz, the number of bits of the sample is 16 bits, and the number of channels is 6, the size of a single audio frame is 46080 bytes. When the sampling frequency is 96 kHz, the number of bits of the sample is 16 bits, and the number of channels is 8, the size of a single audio frame is 61440 bytes.

When the sampling frequency is 96 kHz, the number of bits of the sample is 20/24 bits, and the number of channels is 2, the size of a single audio frame is 23040 bytes. When the sampling frequency is 96 kHz, the number of bits of the sample is 20/24 bits, and the number of channels is 4, the size of a single audio frame is 46080 bytes. When the sampling frequency is 96 kHz, the number of bits of the sample is 20/24 bits, and the number of channels is 6, the size of a single audio frame is 69120 bytes. When the sampling frequency is 96 kHz, the number of bits of the sample is 20/24 bits, and the number of channels is 8, the size of a single audio frame is 92160 bytes.

When the sampling frequency is 192 kHz, the number of bits of the sample is 16 bits, and the number of channels is 2, the size of a single audio frame is 30720 bytes. When the sampling frequency is 192 kHz, the number of bits of the sample is 16 bits, and the number of channels is 4, the size of a single audio frame is 61440 bytes. When the sampling frequency is 192 kHz, the number of bits of the sample is 16 bits, and the number of channels is 6, the size of a single audio frame is 92160 bytes.

When the sampling frequency is 192 kHz, the number of bits of the sample is 20/24 bits, and the number of channels is 2, the size of a single audio frame is 46080 bytes. When the sampling frequency is 192 kHz, the number of bits of the sample is 20/24 bits, and the number of channels is 4, the size of a single audio frame is 92160 bytes. When the sampling frequency is 192 kHz, the number of bits of the sample is 20/24 bits, and the number of channels is 6, the size of a single audio frame is 138240 bytes.

<Value of Channel Assignment>

FIG. 7 is a diagram illustrating an example of the values (Value) stored in the field of the channel assignment (channel_assignment) in FIG. 4. In the example in FIG. 7, examples of the number of channels, channel configuration (configuration), and a channel number allocated to the configuration are illustrated. As illustrated in FIG. 7, even when the number of channels is identical, a plurality of channel configuration exist.

Note that in the example in FIG. 7, M represents monochrome (mono), L represents left, R represents right, C represents center, S represents surround, Rls represents rear surround left, and Rrs represents rear surround right. Vhl represents vertical height left, Vhr represents vertical height right, and Lfe represents low frequency effects. Furthermore, X is a value that is added when the number of channels is an odd number and 0 is set as the sample value. With the above, even when the number of channels is an odd number, the number of channels can be handled as an even number and the process is simplified.

Furthermore, in the example in FIG. 7, the channel configuration of Value 12 on the left side is the channel configuration that has been newly added by the present technology, and the configuration is, actually, 7.1ch.

In the order from the top, Value 1 is the reservation area. Values 1 to 3 are allocated with 2ch. The channel configuration of Value 1 is Mono including a single channel M1, Value 2 is a reservation area, and the channel configuration of Value 3 is stereo including channels L and R.

Values 4 to 7 are allocated with 4ch. The channel configuration of Value 4 is L, C, R (3/0), and the channel configuration of Value 5 is L, R, S (2/1), the channel configuration of Value 6 is L, C, R, S (3/1), and that of Value 7 is L, C, LS, RS (2/2). Values 8 and 9 are allocated with 6ch. The channel configuration of Value 8 is L, C, R, LS, RS (3/2) and the channel configuration of Value 9 is L, C, R, LS, RS, lfe (3/2+lfe).

Values 10 to 12 are allocated with 8ch. The channel configuration of Value 10 is L, C, LS, Rls, Rrs, RS (3/4) and the channel configuration of Value 11 is L, C, LS, Rls, Rrs, RS, lfe (3/4+lfe). The above channel configuration is called "surround back" from the characteristic of assignment.

Furthermore, the channel configuration of Value 12 is L, C, LS, RS, Vhl, Vhr, lfe (5/2+lfe). The above channel configuration is called "front high" from the characteristic of assignment.

Values 13 to 15 are reservation areas.

<Value of Sampling Frequency>

FIG. 8 is a diagram illustrating an example of the values (Value) stored in the field of the sampling frequency (sampling_frequency) in FIG. 4. In the example in FIG. 8, Values 0, 2, 3, and 6 to 15 are reservation areas.

Value 1 is a value that, when stored in the field of the sampling frequency, indicates that the sampling frequency is 48 kHz. Value 4 is a value that, when stored in the above field, indicates that the sampling frequency is 96 kHz. Value 5 is a value that, when stored in the above field, indicates that the sampling frequency is 192 kHz.

<Value of Number of Bits of Sample>

FIG. 9 is a diagram illustrating an example of the values (Value) stored in the field of the number of bits of the sample (bits_per_sample) in FIG. 4.

Value 0 is a reservation area. Value 1 is a value that, when stored in the field of the number of bits of the sample, indicates that the number of bits of the sample is 16 bits/sample. Value 2 is a value that, when stored in the above field, indicates that the number of bits of the sample is 20 bits/sample. Value 3 is a value that, when stored in the above field, indicates that the number of bits of the sample is 24 bits/sample.

Note that when the number of bits of the sample is 16 bits/sample, as illustrated in A of FIG. 10, 16 bits from MSB (b15) to LSB (b0) configure a single sample. When the number of bits of the sample is 24 bits/sample, as illustrated in B of FIG. 10, 24 bits from MSB (b23) to LSB (b0) configure a single sample.

Meanwhile, when the number of bits of the sample is 20 bits/sample, as illustrated in C of FIG. 10, by adding four 0 bits from b3 to LSB (b0) after the 24 bits from MSB (b23) to b4, even if the number of bits of the sample is 20 bits, a single sample can be configured with 24 bits in a similar manner to the case of B of FIG. 10.

The above samples are generated per channel and a sample string referred to as GOLS (Group of LPCM samples) is configured by combining the samples of the channels.

<Exemplary Configuration of GOLS>

Figure 11:
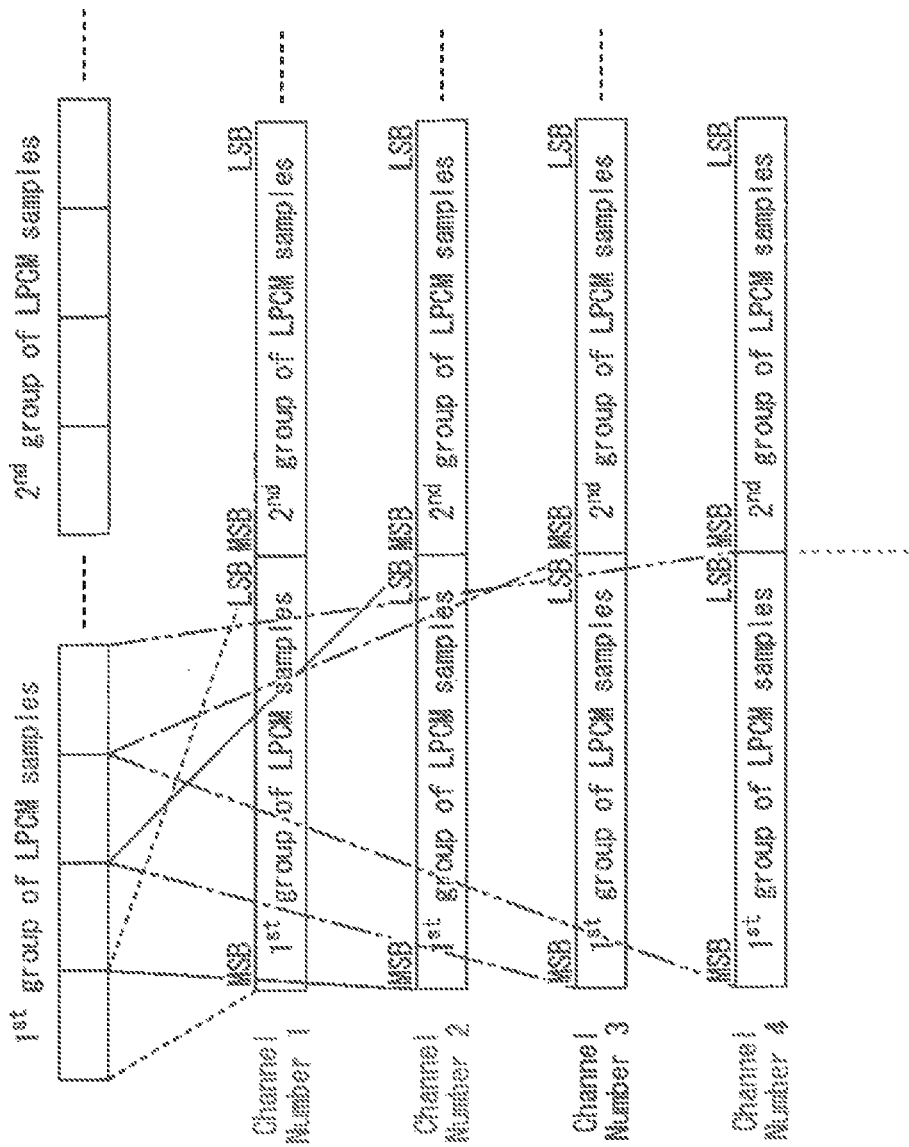
FIG. 11 is a diagram illustrating an exemplary configuration of GOLS.

FIG. 11 is a diagram illustrating an exemplary configuration of GOLS. In the example in FIG. 11, LPCM audio data of four channels, namely, Channel 1 to Channel 4, generates GOLS.

The first sample of Channel 1, the first sample of Channel 2, the first sample of Channel 3, and the first sample of Channel 4 combined in the order of Channel 1 to Channel 4 constitute the first GOLS. In a similar manner, the second GOLS is constituted by the second samples of Channel 1 to Channel 4.

Note that in the example in FIG. 11, although a case in which the number of channels is 4 has been described, actually, there are four types of the number of channels, namely, 2 channels, 4 channels, 6 channels, and 8 channels. Note that in the present technology, with the X described above with reference to FIG. 7, the number of channels is always an even number.

As described above, the LPCM audio frame is constituted by collecting a predetermined number (time periods) of GOLS that are each constituted by a stream in which audio data that have been sampled at the same timing, the number of sampled audio data being the number of channels, are arranged. Furthermore, as it will be described later in FIG. 12, a single LPCMAudioDataPayload is constituted by a single audio frame.

Furthermore, ORG LPCMAudioFrame that is stored in mdat is configured in the same line as ORG LPCMAudioDataPayload. In other words, a single MP4 sample corresponds to a single ORG LPCMAudioDataPayload.

<Examples of Syntax and Semantics of AudioDataPayload>

FIG. 12 is a diagram illustrating an example of syntax and semantics of the ORG LPCMAudioDataPayload.

As illustrated in the syntax in FIG. 12, a single LPCMaudio frame is configured in the ORG LPCMAudioDataPayload.

The semantics corresponding to the syntax in FIG. 12 is defined in the following manner.

A single audio access unit (audio frame) is stored in a single ORG LPCMAudioFrame. Note that while the media data (the elementary stream format) is the same as that of a Blu-ray (registered trademark) Disc-ROM, ORG LPCM is applied to ISOBMFF and is different from the Blu-ray (registered trademark) Disc that is applied to an MPEG-2 transport stream.

Note that in the present technology, as expressed in the following equation (1), a single audio frame is 40 msec, for example. Note that 40 msec is a value reached while considering reduction of the number of processes generated in each MP4 sample and considering the mount load, and the present technology is not limited to the above value. Note that in the present technology, a single audio frame is a single audio access unit. Accordingly, in the present technology, a single audio access unit is 40 msec. Furthermore, equation (1) expresses that, from the MP4 system layer, a single audio access unit of 40 msec is seen as a single MP4 sample.

[Math. 1]

$$1 \text{ audio frame} = 40 \text{ msec} = (1 \text{ MP4 sample}) \quad (1)$$

Furthermore, as expressed in equation (2), in the BOX of the MP4 system, a single audio sample is a single audio frame (audio access unit) and 40 msec is 1920 samples/ch (fs=48 kHz). In other words, if a process were to be performed in each sample, 1920 processes will be required; however, in the present technology, since 1920 samples are collectively processed as a single access unit, the number of processes is reduced substantially. With the above, the readout load can be reduced.

[Math. 2]

$$1 \text{ audio sample in MP4BOX} = 1 \text{ audio frame(audio access unit)} = 40 \text{ msec} = 1920 \text{ samples/ch(fs=48 kHz)} \quad (2)$$

Note that when, for example, 48 kHz, 16 bit, and 5.1ch, then the number of bytes of a single audio frame (a single access unit) is 23040 bytes. The above byte size is the value stored in the field of the audio data size in FIG. 4 described above.

Second Embodiment

<Exemplary Configuration of Signal Processing System>

Figure 13:
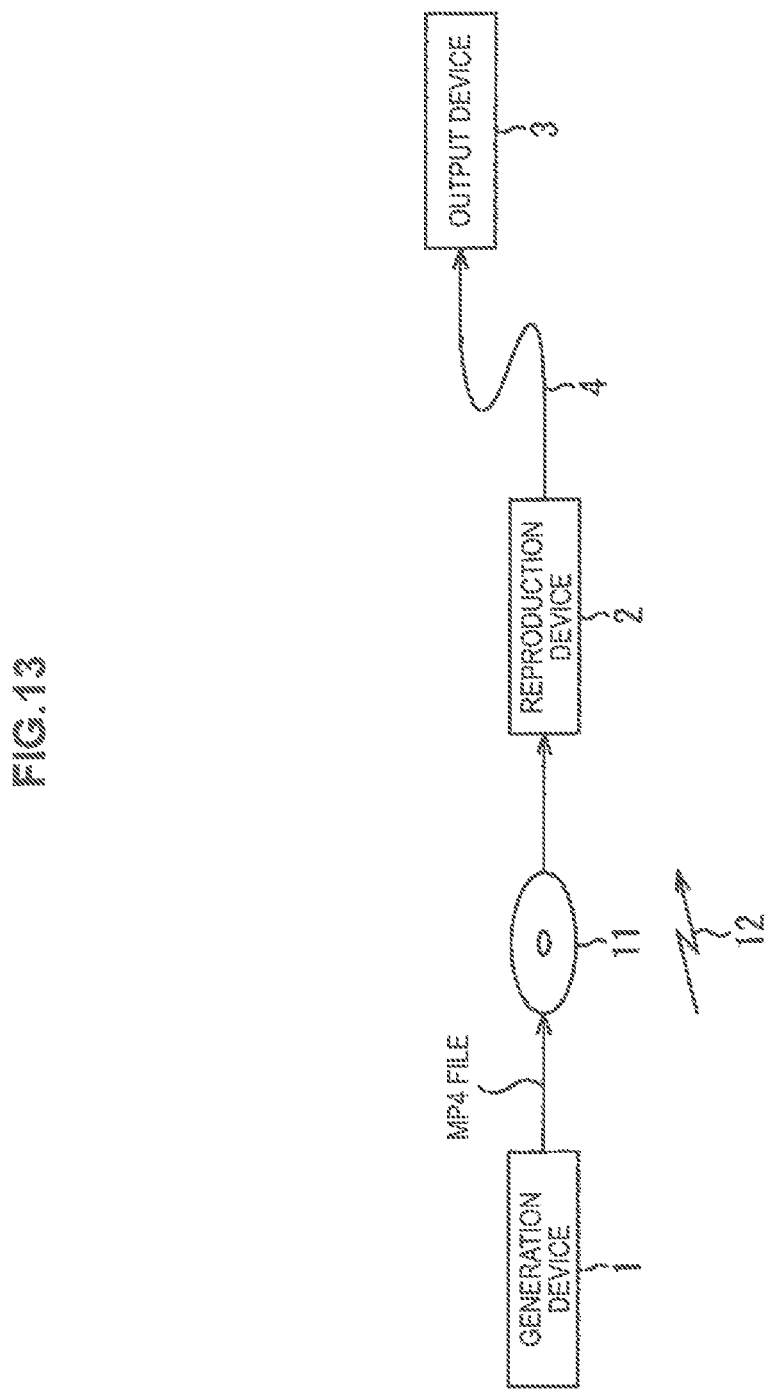
FIG. 13 is a block diagram illustrating an exemplary configuration of a signal processing system to which the present technology is applied.

FIG. 13 is a block diagram illustrating an exemplary configuration of a signal processing system to which the present technology has been applied. In the signal processing system of FIG. 13, the ORG LPCM audio format described above in the first embodiment is adopted as the file format.

The signal processing system in FIG. 13 includes a generation device 1, a reproduction device 2, and an output device 3. The reproduction device 2 and the output device 3 are connected through, for example, a high-definition multimedia interface (HDMI, registered trade mark) cable 4. The reproduction device 2 and the output device 3 may be connected through a cable of another standard or may be connected via radio communication.

The generation device 1 generates a stream of contents. The reproduction device 2 reproduces the contents from the stream provided from the generation device 1.

The generation device 1 is capable of directly providing the stream, for example. Alternatively, the generation device 1 is capable of providing the stream after storing the stream, for example, in a predetermined packet such as an IP packet or in a predetermined file such as an MP4 file that is stipulated in ISO/IEC14496-14, for example.

Furthermore, in the generation device 1, the stream may be provided after recoding the stream on a recording medium 11 such as a Blu-ray (registered trademark) disc, or alternatively, the stream may be transmitted through a transmission medium 12 such as, for example, ground wave, the Internet, and the like.

Herein, in the generation device 1, in a case in which the stream is stored in a file, other than an MP4 file, a file such as, for example, a file (file in ISO base media file format) stipulated in ISO/IEC 14496-12, a file stipulated in ISO/IEC 14496-15, a file in QuickTime format, another file that have a box structure or, further, a file that does not have a box structure can be employed as the file to store the steam.

In the signal processing system in FIG. 13, although video data is also processed, hereinafter, a case in which audio data is processed will be described as an example.

Audio data is input to the generation device 1. The generation device 1 analyzes the input audio data to specify the channel assignment, the sampling frequency, and the number of bits of the sample, and performs processing to convert the input data into the sample. The above sample is a sample of audio data sampled in an LPCM format.

Furthermore, the generation device 1 performs encoding processing on the converted sample. In other words, the generation device 1 performs, as the encoding processing, media data generation processing in which, after a sample string called GOLS described above while referring to FIG. 11 has been generated by combining the sample of each channel, GOLS is stored in mdat.

The generation device 1 generates AudioSampleEntry, generates an audio track, stores the generated audio track and the media data in an MP4 file, and generates an MP4 file. The generation device 1 records the generated MP4 file in the recording medium 11 and transmits the generated MP4 file through the transmission medium 12.

The reproduction device 2 acquires the MP4 file by reading out the MP4 file recorded in the recording medium 11 or acquires the MP4 file by receiving the MP4 file transmitted through the transmission medium 12, and reproduces the data stored in the MP4 file.

In other words, the reproduction device 2 reads out the data stored in the MP4 file and acquires the audio track and AudioSampleEntry. Furthermore, the reproduction device 2 acquires the audio frame from mdat and performs decoding processing thereon, and transmits the generated audio signal to the output device 3 through the cable 4.

The reproduction device 2, as decoding processing, transmits (outputs) to the output device 3 an audio signal formed of an ORG LPCM sample, which is to be reproduced, after acquiring GOLS from the audio frame on the basis of t the number of channels specified from AudioSampleEntry.

The output device 3 includes a monitor and a loudspeaker. On the basis of an audio signal transmitted from the reproduction device 2, the output device 3 outputs the corresponding audio.

Note that in a case in which video data is stored in the MP4 file with the generation device 1, the reproduction device 2 reproduces the video data and transmits the video data to the output device 3. On the basis of the video data transmitted from the reproduction device 2, the output device 3 displays the corresponding image on the monitor.

<Exemplary Configuration of Generation Device>

Figure 14:
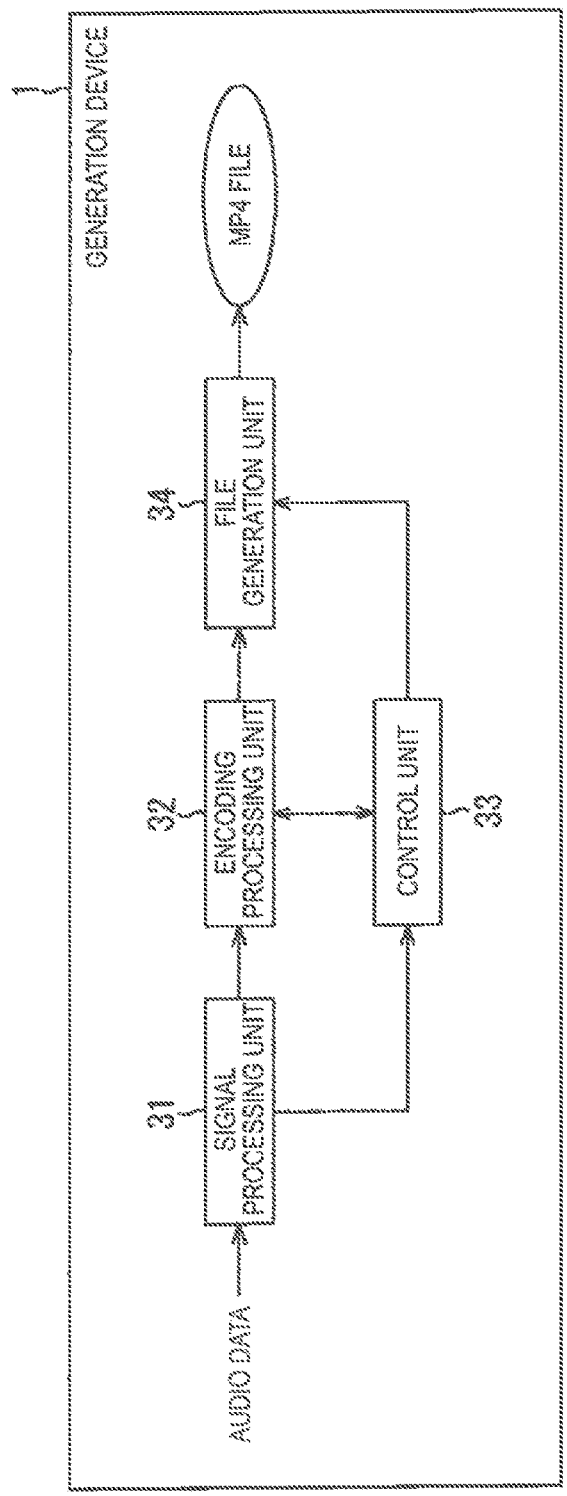
FIG. 14 is a block diagram illustrating an exemplary configuration of a generation device.

FIG. 14 is a block diagram illustrating an exemplary configuration of the generation device.

The generation device 1 in FIG. 14 is configured so as to include a signal processing unit 31, an encoding processing unit 32, a control unit 33, and a file generation unit 34.

Audio data is input to the signal processing unit 31. The signal processing unit 31 analyzes the input audio data to specify the channel assignment, the sampling frequency, and the number of bits of the sample, and performs processing to convert the input data into the sample. The signal processing unit 31 outputs the converted sample to the encoding processing unit 32 and supplies information of the specified channel assignment, sampling frequency, number of bits of the sample, and the like to the control unit 33.

Under the control of the control unit 33, the encoding processing unit 32 performs encoding processing on the converted sample. In other words, as the encoding processing, the encoding processing unit 32 performs, after the sample string called GOLS described above while referring to FIG. 11 has been generated by combining the sample of each channel, generation processing of media data per access unit, in which a plurality of samples during a certain time period has been collected. The encoding processing unit 32 outputs the generated media data to the file generation unit 34.

On the basis of the signal from the signal processing unit 31, the control unit 33 controls the encoding processing of the encoding processing unit 32 and generates AudioSampleEntry and an audio track. The control unit 33 supplies the generated audio track to the file generation unit 34.

The file generation unit 34 stores media data from the encoding processing unit 32 in mdat and generates an MP4 file using the mdat and the audio track from the control unit 33.

<Exemplary Configuration of Reproduction Device>

Figure 15:
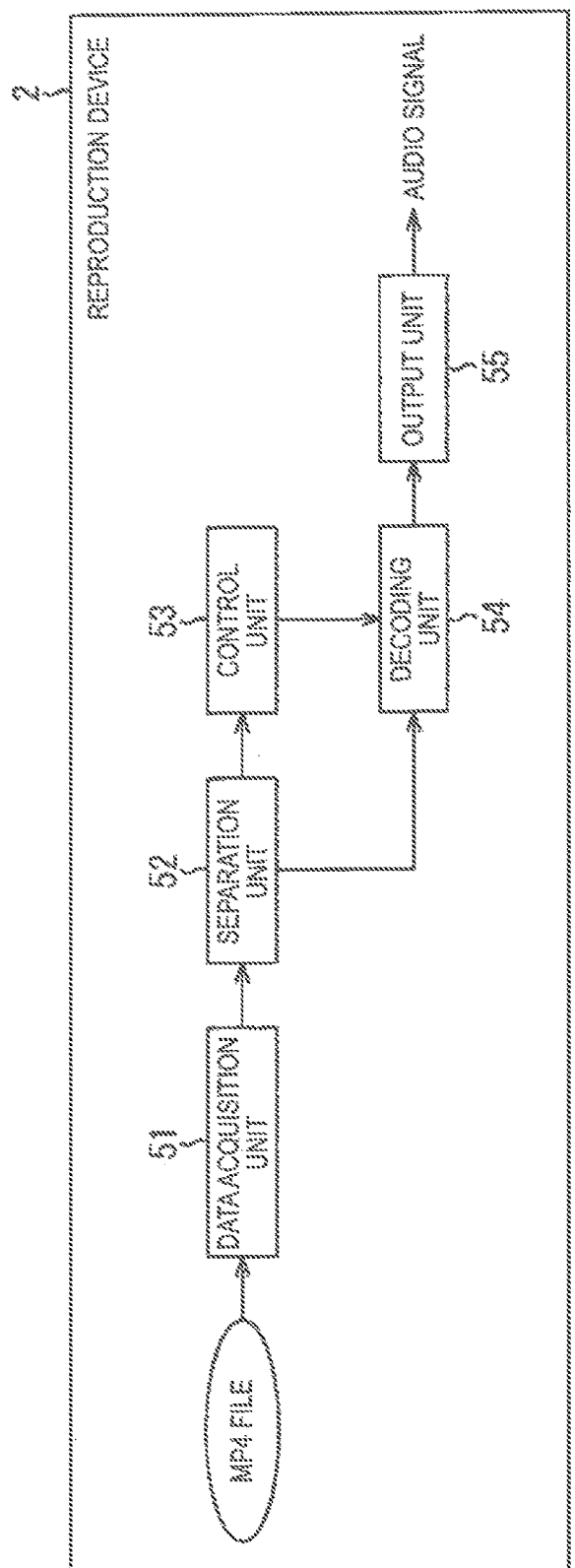
FIG. 15 is a block diagram illustrating an exemplary configuration of a reproduction device.

FIG. 15 is a block diagram illustrating an exemplary configuration of the reproduction device.

The reproduction device 2 in FIG. 15 is configured so as to include a data acquisition unit 51, a separation unit 52, a control unit 53, a decoding unit 54, and an output unit 55.

An MP4 file that is acquired by reading out an MP4 file recorded in the recording medium 11 or an MP4 file acquired by receiving an MP4 file transmitted through the transmission medium 12 is input to the data acquisition unit 51. The data acquisition unit 51 reads out data from the input MP4 file and outputs the data that has been read out to the separation unit 52.

The separation unit 52 separates the data from the data acquisition unit 51 into data of the MP4 system supplied to the control unit 53 and the data supplied to the decoding unit 54. In other words, the separation unit 52 acquires an audio track from the data from the data acquisition unit 51 and, further, acquires AudioSampleEntry, and supplies the acquired information of AudioSampleEntry to the control unit 53. Furthermore, the separation unit 52 acquires audio frame (access unit) from mdat and outputs the acquired audio frame to the decoding unit 54.

On the basis of the information written on the AudioSampleEntry from the separation unit 52, the control unit 53 controls the decoding processing of the decoding unit 54.

Under the control of the control unit 53, the decoding unit 54 performs decoding processing of the audio frame (a single access unit) from the separation unit 52. In other words, under the control of the control unit 53, the decoding unit 54 acquire GOLS from the audio frame and outputs the ORG LPCM sample that is to be reproduced to the output unit 55.

The output unit 55 transmits, to the output device 3, an audio signal formed of the ORG LPCM sample, which is to be reproduced, from the decoding unit 54.

<Generation Processing>

Figure 16:
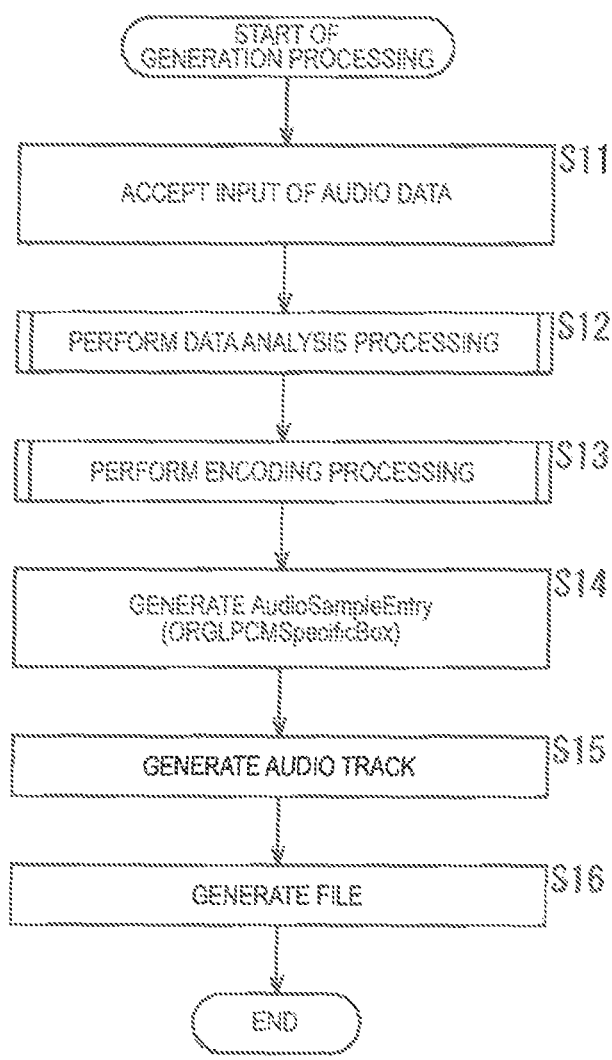
FIG. 16 is a flowchart describing generation processing of an MP4 file.

With reference to the flowchart in FIG. 16, generation processing of an MP4 file of the generation device 1 will be described next.

Audio data is input to the signal processing unit 31. In step S11, the signal processing unit 31 accepts an input of audio data. In step S12, the signal processing unit 31 performs analysis processing of the audio data, the input of which has been accepted in step S11. The data analysis processing will be describe later with reference to FIG. 17.

In step S12, information such as the channel assignment, the sampling frequency, and the number of bits of the sample is specified and, furthermore, the audio data is converted into a sample. The specified information is supplied to the control unit 33. Furthermore, the data constituted by the sample converted in step S12 output to the encoding processing unit 32.

In step S13, which under the control of the control unit 33, the encoding processing unit 32 performs in coding processing of the data constituted by the sample converted in step S12. The encoding processing will be described later with reference to FIG. 19.

Media data is generated in the encoding processing in step S13 and the generated media data is output to the file generation unit 34.

In step S14, the control unit 33 generates (sets) AudioSampleEntry (ORGLPCMSpecificBox) illustrated in FIG. 2 described above based on information such as the channel assignment, the sampling frequency, and the number of bits of the sample that are from the signal processing unit 31.

In step S15, the control unit 33 generates an audio track using the generated AudioSampleEntry. The control unit 33 supplies the generated audio track to the file generation unit 34.

In step S16, the file generation unit 34 generates an MP4 file using the audio track from the control unit 33 and the media data from the encoding processing unit 32. In other words, the file generation unit 34 stores media data from the encoding processing unit 32 in mdat and generates an MP4 file using the mdat and the audio track from the control unit 33.

<Data Analysis Processing>

Referring to the flowchart in FIG. 17, the data analysis processing performed in step S12 in FIG. 16 will be described next.

In step S31, the signal processing unit 31 specifies the channel assignment (assignment). In step S32, the signal processing unit 31 specifies the sampling frequency. In step S33, the signal processing unit 31 specifies the number of bits of the sample.

In step S34, the signal processing unit 31 performs sample conversion processing using the information specified in steps S31 to S33. The sample conversion processing will be described later with reference to FIG. 18.

Step S34 converts the audio data into a sample. In step S35, the signal processing unit 31 outputs the data formed of the converted sample to the encoding processing unit 32.

<Sample Conversion Processing>

Referring to the flowchart in FIG. 18, the sample conversion processing performed in step S34 in FIG. 17 will be described next.

In step S51, the signal processing unit 31 determines whether the sample length is 20 bits. In step S51, when the sample length is determined to be 20 bits, the process proceeds to step S52.

Figure 17:
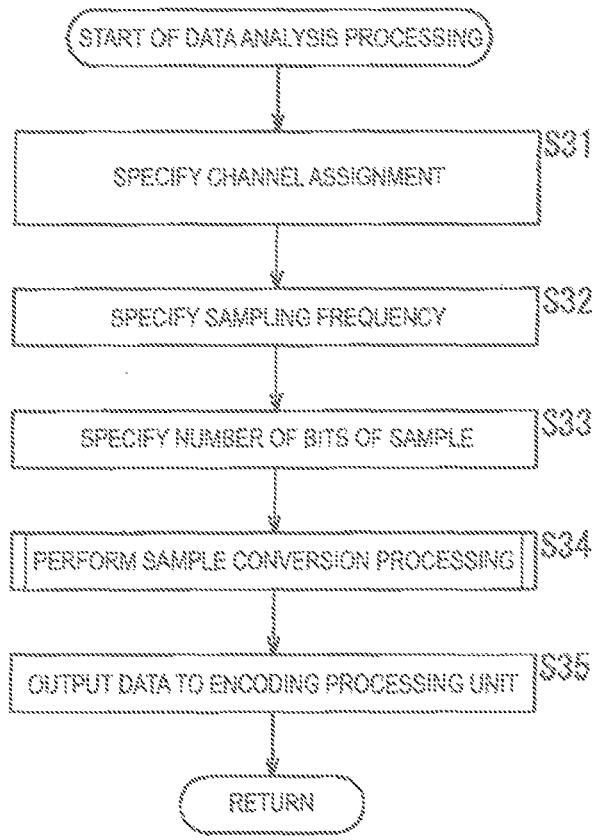
FIG. 17 is a flowchart describing data analysis processing.
Figure 18:
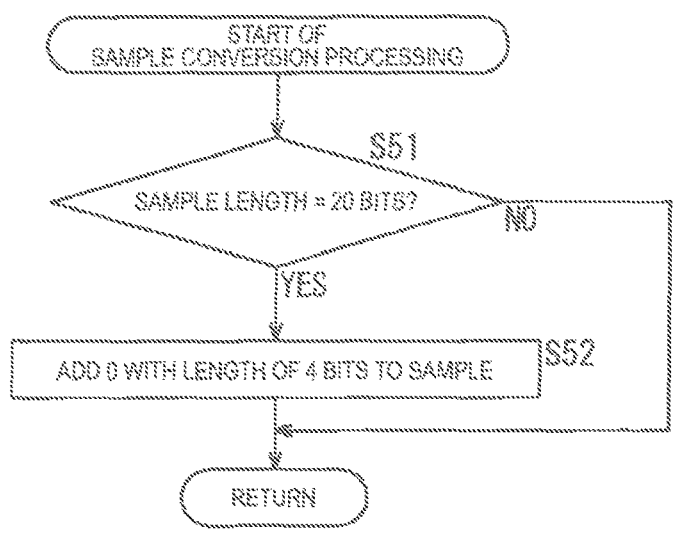
FIG. 18 is a flowchart describing sample conversion processing.

In step S52, the signal processing unit 31 adds 0 with a length of 4 bits to the sample and returns to step S34 in FIG. 17.

Furthermore, in step S51, when the sample length is determined not to be 20 bits, the process of step S52 is skipped and the process returns to step S34 in FIG. 17.

With the above, as described above with reference to C of FIG. 10, even when the number of bits of the sample is 20 bits, in a similar manner to that of B of FIG. 10, a single sample can be configured by 24 bits.

<Encoding Processing>

Referring to the flowchart in FIG. 19, the encoding processing performed in step S13 in FIG. 16 will be described next.

In step S71, the encoding processing unit 32 performs GOLS generation processing in which the sample string called GOLS described above while referring to FIG. 11 is generated by combining the sample of each channel. The GOLS generation processing will be described later with reference to FIG. 20.

Step S71 generates GOLS. In step S32, the encoding processing unit 32 performs media data generation processing. The media data generation processing will be described later with reference to FIG. 21.

Step S72 generates media data stored in mdat, and the generated media data is output to the file generation unit 34. The process returns to step S13 in FIG. 16.

<GOLS Generation Processing>

Referring to the flowchart in FIG. 20, the GOLS generation processing performed in step S71 in FIG. 19 will be described next.

In step S91, under the control of the control unit 33, the encoding processing unit 32 specifies the number n of channels. In step S92, the encoding processing unit 32 determines whether the number n of channels is an odd number.

In step S92, when the number n of channels is determined to be an odd number, the process proceeds to step S93. In step S93, the encoding processing unit 32 inserts 0 in the $n+1^{th}$ sample.

In step S92, when the number n of channels is determined to be not an odd number, the process skips step S93 and proceeds to step S94.

Figure 19:
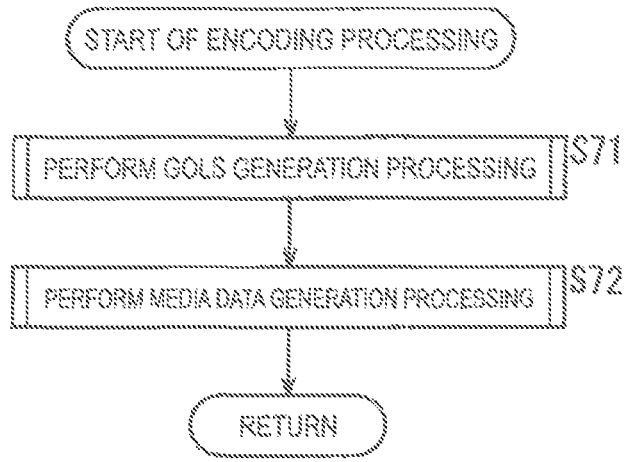
FIG. 19 is a flowchart describing encoding processing.
Figure 20:
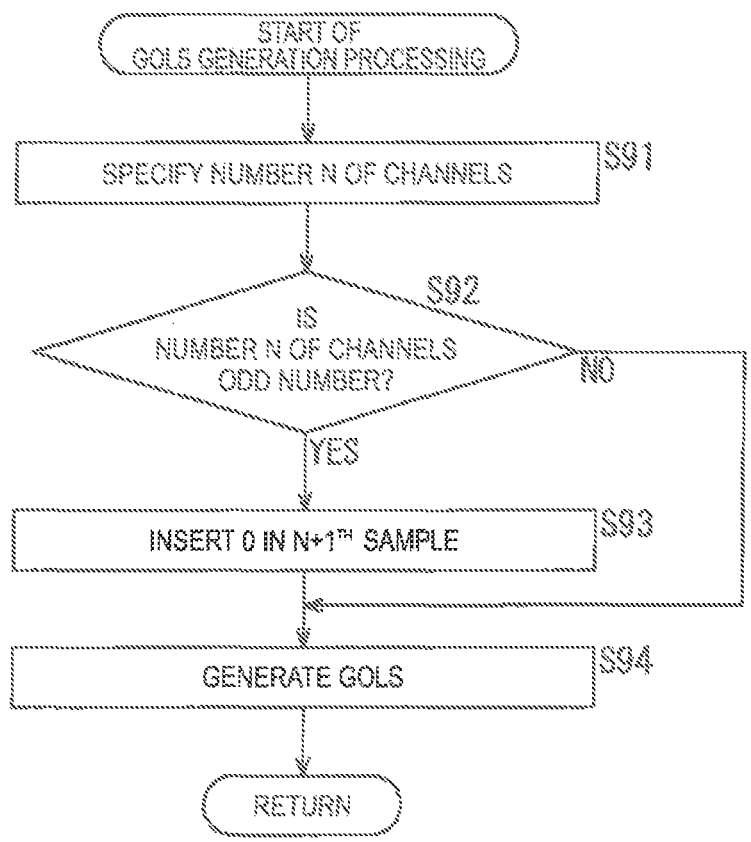
FIG. 20 is a flowchart describing GOLS generation processing.

In step S94, the encoding processing unit 32 generates GOLS, and the process returns to step S71 in FIG. 19.

With the above, as described above with reference to FIG. 7, even when the number n of channels is an odd number, the channel number can be handled as an even number; accordingly, the process can be simplified.

<Media Data Generation Processing>

Figure 21:
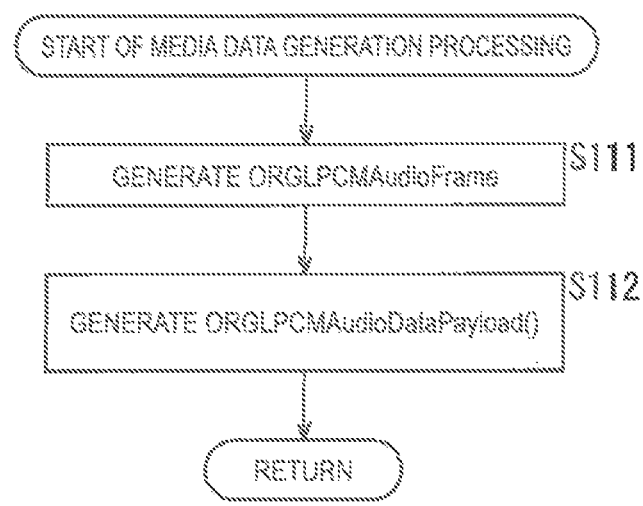
FIG. 21 is a flowchart describing media data generation processing.

Referring to the flowchart in FIG. 21, the media data generating processing performed in step S72 in FIG. 19 will be described next.

In step S111, under the control of the control unit 33, the encoding processing unit 32 generates ORGLPCMAudioFrame (a single access unit) with GOLS (sample) that is within a predetermined time (40 msec, for example). For example, in equation (2) described above, when the sampling frequency is 48 kHz, 1920 samples are collected to generate a single audio frame.

In step S112, the encoding processing unit 32 copies ORGLPCMAudioFrame to ORGLPCMAudioDataPayload( ) and generates ORGLPCMAudioDataPayload( ).

A plurality of the above ORGLPCMAudioDataPayload( ) are generated and are stored in mdat.

<Reproduction Processing>

Figure 22:
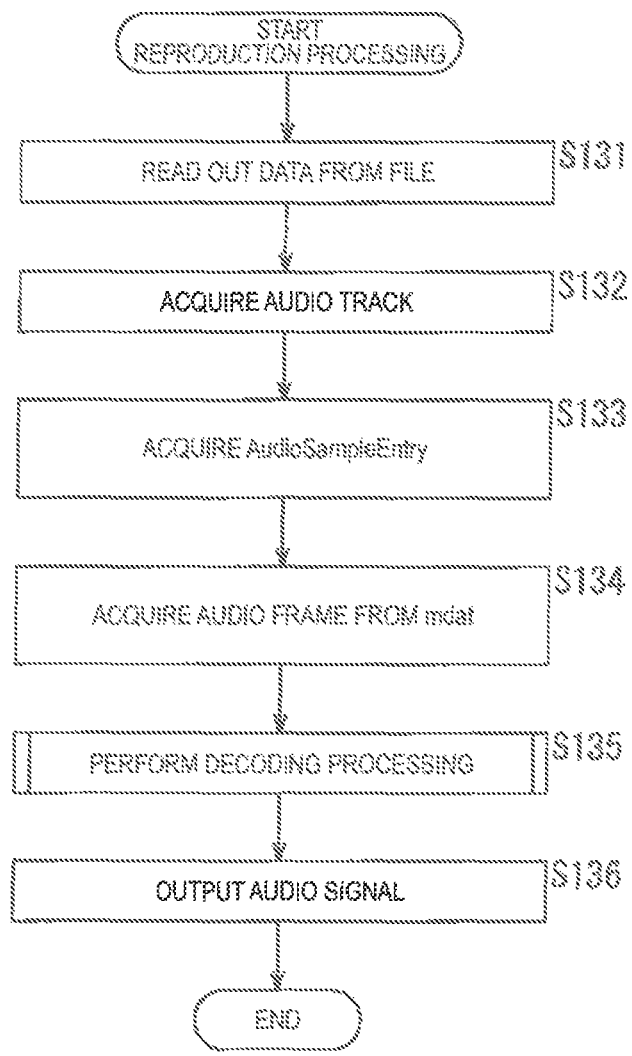
FIG. 22 is a flowchart describing reproduction processing.

With reference to the flowchart in FIG. 22, reproduction processing of the reproduction device 2 will be described next.

An MP4 file that is acquired by reading out an MP4 file recorded in the recording medium 11 or an MP4 file acquired by receiving an MP4 file transmitted through the transmission medium 12 is input to the data acquisition unit 51. In step S131, the data acquisition unit 51 reads out data from the input MP4 file and outputs the data that has been read out to the separation unit 52.

In step S132, the separation unit 52 acquires audio track from the data from the data acquisition unit 51. Furthermore, in step S133, the separation unit 52 acquires AudioSampleEntry indicated in FIG. 2 described above from the acquired audio track, and supplies the information on the acquired AudioSampleEntry to the control unit 53. In other words, the data of the MP4 file system is separated and is supplied to the control unit 53.

Furthermore, the separation unit 52 refers to the AudioSampleEntry (the audio data size of the box specifying ORG LPCM in FIG. 4), in step S134, acquires audio frame per access unit from mdat, and outputs the acquired audio frame to the decoding unit 54.

In step S135, under the control of the control unit 53, the decoding unit 54 performs decoding processing of the audio frame from the separation unit 52. The decoding processing will be described later with reference to FIG. 23.

Step S135 acquires GOLS from the audio frame and outputs the ORG LPCM sample to be reproduced to the output unit 55.

In step S136, the output unit 55 outputs and audio signal formed of the LPCM sample to be reproduced, which is from the decoding unit 54, and transmits the LPCM sample to be reproduced to the output device 3.

<Decoding Processing>

Figure 23:
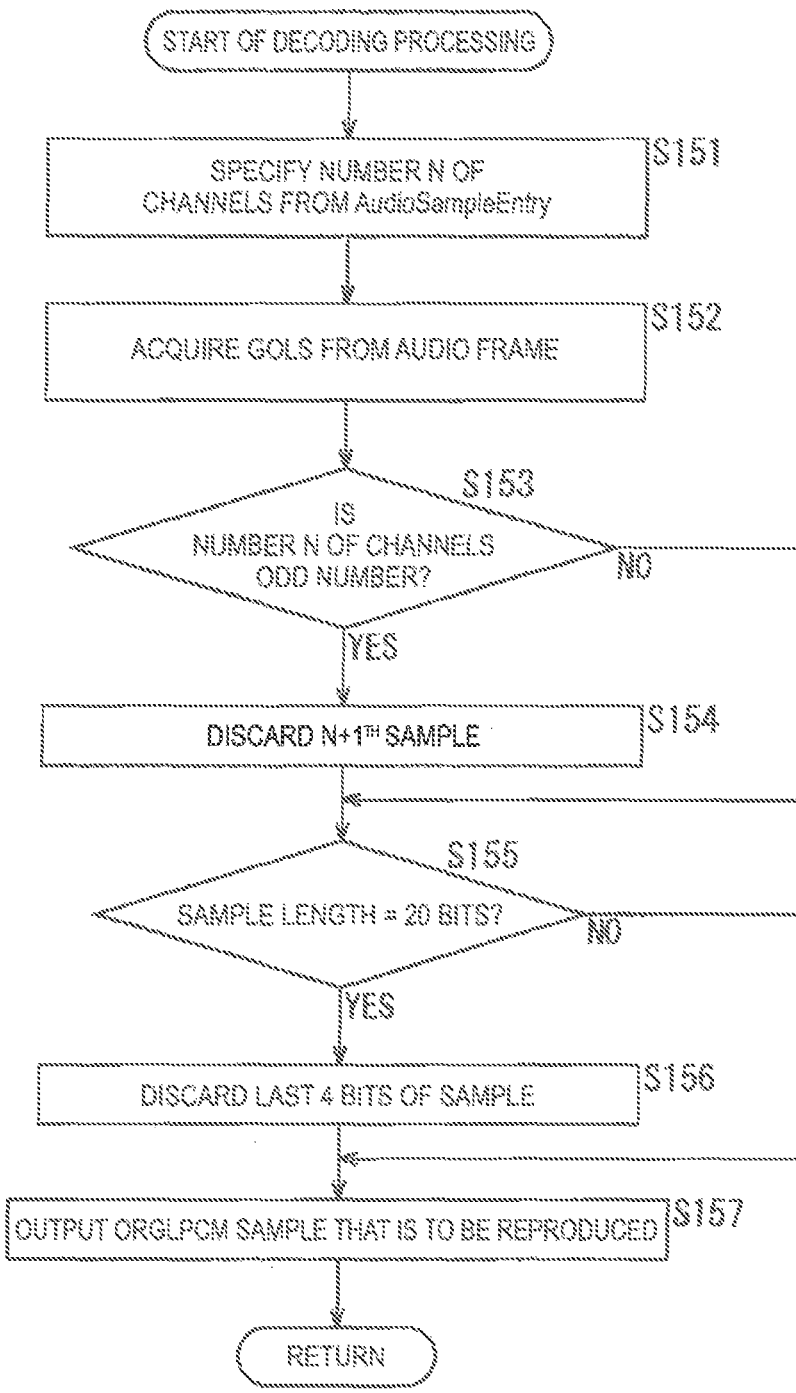
FIG. 23 is a flowchart describing decoding processing.

Referring to the flowchart in FIG. 23, the decoding processing performed in step S135 in FIG. 22 will be described next. As it has been described above, the above processing is performed per access unit.

In step S151, the control unit 53 specifies the number n of channels from AudioSampleEntry (the channel assignment of the box specifying ORG LPCM in FIG. 4) from the separation unit 52.

In step S152, the decoding unit 54 acquires GOLS from the audio frame. In step S153, the control unit 53 determines whether the number n of channels is an odd number.

In step S153, when the number n of channels is determined to be an odd number, the process proceeds to step S154. In step S154, under the control of the control unit 53, the decoding unit 54 discards the n+1$^{th}$ sample.

In step S153, when the number n of channels is determined not to be an odd number but an even number, step S154 is skipped and the process proceeds to step S155.

In step S155, the control unit 53 determines whether the sample length is 20 bits on the basis of the AudioSampleEntry (the number of bits of the sample of the box specifying ORG LPCM in FIG. 4) from the separation unit 52. In step S155, when the sample length is determined to be 20 bits, the process proceeds to step S156. In step S156, under the control of the control unit 53, the decoding unit 54 discards the last 4 bits of the sample.

In step 155, when the sample length is determined not to be 20 bits, step S155 is skipped and the process proceeds to step S157.

In step S157, the decoding unit 54 outputs the ORGLPCM sample to be reproduced to the output unit 55.

As described above, in the ORG LPCM format, AudioSampleEntry is extended and a box including at least a field that stores the number of channels and the channel assignments corresponding to 2, 4, 6, and 8 is provided.

With the above, not only a case in which the number of channels is 2, cases in which the number of channels exceeds 2 can be dealt with.

Note that AudioSampleEntry is extended on the basis of the channel assignment information of a Blu-ray (registered trademark) Disc; accordingly, reproduction through a Blu-ray (registered trademark) Disc system is relatively easy, which is an advantage in implementing the present technique.

Furthermore, an audio access unit that is a collection of a plurality of quantized samples within a predetermined time is configured by forming an audio stream (GOLS) that is a string of audio sample data for the number of channels, the audio sample data having been sampled at the same time.

With the above, processing can be performed per audio access unit. Accordingly, the readout load can be reduced compared to LPCM that reads out in a unit of a single quantized sample. In particular, the number of processing that performs a loop for each sample can be substantially reduced.

Third Embodiment

<Computer Configuration Example>

The series of process described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 24 is a block diagram showing an example configuration of the hardware of a computer that executes the series of processes described earlier according to a program.

In a computer, a CPU (Central Processing Unit) 201, a ROM (Read Only Memory) 202, and a RAM (Random Access Memory) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone or the like. The output unit 207 configured from a display, a speaker or the like. The storage unit 208 is configured from a hard disk, a non-volatile memory or the like. The communication unit 209 is configured from a network interface or the like. The drive 210 drives a removable recording medium 211 such as a magnetic disk, an optical disk, a magneto-optical disk, a semiconductor memory or the like.

In the computer configured as described above, as one example the CPU 201 loads a program stored in the storage unit 208 via the input/output interface 205 and the bus 204 into the RAM 203 and executes the program to carry out the series of processes described earlier.

As one example, the program executed by the computer (the CPU 201) may be provided by being recorded on the removable recording medium 211 as a packaged medium or the like. The program can also be provided via a wired or wireless transfer medium, such as a local area network, the Internet, or a digital satellite broadcast.

In the computer, by loading the removable recording medium 211 into the drive 210, the program can be installed into the storage unit 208 via the input/output interface 205. It is also possible to receive the program from a wired or wireless transfer medium using the communication unit 209 and install the program into the storage unit 208. As another alternative, the program can be installed in advance into the ROM 202 or the storage unit 208.

Note that the program executed by the computer may be a program in which processes are carried out in a time series in the order described in this specification or may be a program in which processes are carried out in parallel or at necessary timing, such as when the processes are called.

Note that, in this specification, steps that write the program to be recorded in the recording medium do not necessarily have to be performed in time series in line with the order of the steps, and instead may include processing that is performed in parallel or individually.

Further, in this specification, "system" refers to a whole device composed of a plurality of devices.

Further, an element described as a single device (or processing unit) above may be divided and configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

A file generation device including:

a media data generation unit configured to generate media data by forming a stream in which pieces of audio data for the number of channels are serially aligned, the pieces of audio data having been sampled at a same timing;

a sample entry generation unit configured to generate a sample entry by setting a box provided with a field that indicates information on channel assignment of the number of channels after AudioSampleEntry that manages a sample of the audio data; and a file generation unit configured to generate a file formed of the media data generated by the encoding unit and the sample entry generated by the sample entry generation unit.

(2)

The file generation device according to (1), wherein the box includes a field indicating information on the number of readout bytes of the media data.

(3)

The file generation device according to (2), wherein the media data generation unit generates, from the stream, media data formed per an access unit in which a plurality of quantized samples are collected, and wherein the sample entry generation unit sets, as the information on the number of readout bytes of the media data, the box provided with the field indicating a size of the access unit, and generates a sample entry.

(4)

The file generation device according to any of (1) to (3), wherein the sample entry generation unit sets the box provided with the field that indicates information on channel assignment of the number of channels immediately after AudioSampleEntry that manages the sample of the audio data.

(5)

The file generation device according to any of (1) to (4), wherein the box includes a field indicating information on a sampling frequency of the audio data.

(6)

The file generation device according to any of (1) to (5), wherein the box includes a field indicating information on a quantization bitrate of the audio data.

(7)

The file generation device according to any of (1) to (6), wherein the number of channels is either 2ch, 4ch, 6ch, or 8ch.

(8)

The file generation device according to (7), wherein the channel assignment of the 8ch is 7.1ch front high.

(9)

The file generation device according to any of (1) to (8), wherein the sample is a sample of audio data sampled in a linear PCM format.

(10)

A file generation method performed by a file generation device, the file generation method including:

generating media data by forming a stream in which pieces of audio data for the number of channels are serially aligned, the pieces of audio data having been sampled at a same timing;

generating a sample entry by setting a box provided with a field that indicates information on channel assignment of the number of channels after AudioSampleEntry that manages a sample of the audio data; and generating a file formed of the media data that has been generated and the sample entry that has been generated.

(11)

A file reproduction device including:

a data separation unit configured to separate a sample entry and media data from a file, the media data having been generated by forming a stream in which pieces of audio data for the number of channels are serially aligned, the pieces of audio data having been sampled at a same timing;

a sample entry acquisition unit configured to acquire, from the sample entry separated by the data separation unit, a box provided with a field that indicates information on channel assignment of the number of channels that has been set after AudioSampleEntry that manages a sample of the audio data; and a decoding unit configured to, on a basis of the box acquired by the sample entry acquisition unit, decode the media data separated by the data separation unit and output the sample of the audio data.

(12)

The file reproduction device according to (11), wherein the box includes a field indicating information on the number of readout bytes of the media data.

(13)

The file reproduction device according to (12), wherein the sample entry acquisition unit acquires, as the information on the number of readout bytes of the media data, the box provided with the field indicating a size of an access unit in which a plurality of quantized samples are collected, from the stream, and wherein on a basis of the box acquired by the sample entry acquisition unit, the decoding unit decodes, per the access unit, the media data separated by the data separation unit and outputs the sample of the audio data.

(14)

The file reproduction device according to any of (11) to (13), wherein the sample entry acquisition unit acquires, from the sample entry separated by the data separation unit, a box provided with a field that indicates information on channel assignment of the number of channels that has been set immediately after AudioSampleEntry that manages the sample of the audio data.

(15)

The file reproduction device according to any of (11) to (14), wherein the box includes a field indicating information on a sampling frequency of the audio data.

(16)

The file reproduction device according to any of (11) to (15), wherein the box includes a field indicating information on a quantization bitrate of the audio data.

(17)

The file reproduction device according to any of (11) to (16), wherein the number of channels is either 2ch, 4ch, 6ch, or 8ch.

(18)

The file reproduction device according to (17), wherein channel assignment of the 8ch is 7.1ch front high.

(19)

The file reproduction device according to any of (11) to (18), wherein the sample is a sample of audio data sampled in a linear PCM format.

(20)

A file reproduction method performed by a file reproduction device, the file reproduction method including:

separating a sample entry and media data from a file, the media data having been generated by forming a stream in which pieces of audio data for the number of channels are serially aligned, the pieces of audio data having been sampled at a same timing;

acquiring a box provided with a field that indicates information on channel assignment of the number of channels that has been set after AudioSampleEntry that manages a sample of the audio data; and decoding, on a basis of the box that has been acquired, the media data that has been separated, and outputting the sample of the audio data.

REFERENCE SIGNS LIST 1 generation device
2 reproduction device
3 output device
4 cable
11 recording medium
12 transmission medium
31 signal processing unit
32 encoding processing unit
33 control unit
34 file generation unit
51 data acquisition unit
52 separation unit
53 control unit
54 decoding unit
55 output unit

The invention claimed is:

1. A file generation device comprising:
a media data generation unit configured to generate media data by generation of a stream in which a plurality of channels are serially aligned from pieces of audio data that are concurrently sampled from respective channels of the plurality of channels;
a sample entry generation unit configured to generate a sample entry based on a box that includes a first field that indicates information on channel assignment of the plurality of channels, wherein the box is set after AudioSampleEntry class that manages a sample of the audio data, and wherein the box is a sub class of the AudioSampleEntry class; and
a file generation unit configured to generate a file that includes the media data and the sample entry.

2. The file generation device according to claim 1, wherein the box includes a second field indicating information on a number of readout bytes of the media data.

3. The file generation device according to claim 2, wherein the media data generation unit is further configured to generate, from the stream, the media data per an access unit in which a plurality of quantized samples are collected, and wherein the sample entry generation unit is further configured to set, as the information on the number of readout bytes of the media data, the box with the second field indicating a size of the access unit, and generate the sample entry.

4. The file generation device according to claim 1, wherein the sample entry generation unit is further configured to set the box that includes the first field immediately after the AudioSampleEntry class that manages the sample of the audio data.

5. The file generation device according to claim 1, wherein the box includes a third field indicating information on a sampling frequency of the audio data.

6. The file generation device according to claim 1, wherein the box includes a fourth field indicating information on a quantization bitrate of the audio data.

7. The file generation device according to claim 1, wherein the plurality of channels is one of 2ch, 4ch, 6ch, or 8ch.

8. The file generation device according to claim 7, wherein the channel assignment of the 8ch is 7.1ch front high.

9. The file generation device according to claim 1, wherein the sample of the audio data is sampled in a linear PCM format.

10. A file generation method, comprising:
in a file generation device:
generating media data by generation of a stream in which a plurality of channels are serially aligned from pieces of audio data that are concurrently sampled from respective channels of the plurality of channels;
generating a sample entry based on a box that includes a field that indicates information on channel assignment of the plurality of channels, wherein the box is set after AudioSampleEntry class that manages a sample of the audio data, and wherein the box is a sub class of the AudioSampleEntry class; and generating a file that includes the media data and the sample entry.

11. The file generation device according to claim 1, wherein the file is defined as a standard by DECE CFF.

* * * * *